Oct. 15, 1935.  J. MERCIER  2,017,419
CUSHIONING DEVICE
Filed Dec. 16, 1932
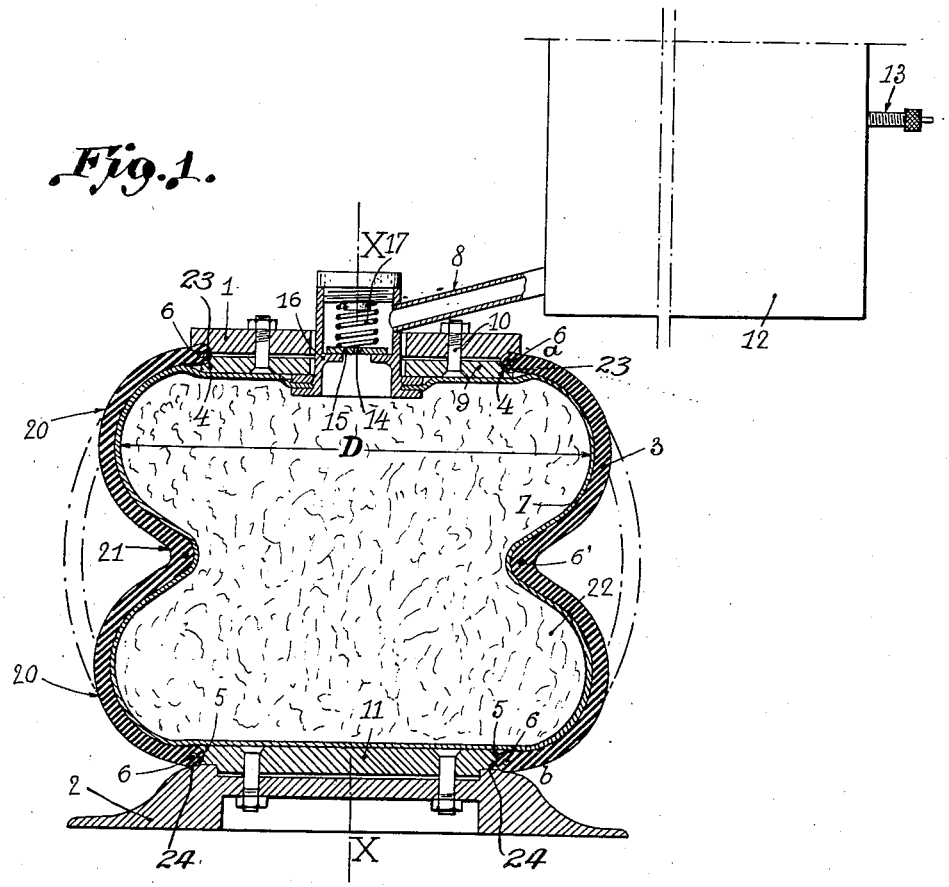
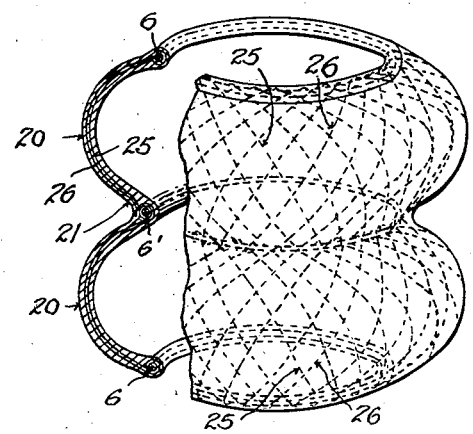
Jean Mercier
INVENTOR
By [signature]
his Attorney.

Patented Oct. 15, 1935

2,017,419

UNITED STATES PATENT OFFICE 2,017,419

CUSHIONING DEVICE

Jean Mercier, Neuilly-sur-Seine, France

Application December 16, 1932, Serial No. 647,627
In France December 30, 1931

REISSUED

1 Claim. (Cl. 267—35)

The present invention relates to a cushioning device applicable to suspension devices for automobiles or other vehicles, landing gears for aircraft, buffers, percussion frames, shaking apparatus and generally to every device in which it is desirable to interpose a yielding element between two members adapted to move relatively to each other. This cushioning device is of the type in which a fluid under pressure is contained in a receptacle or container which is subject to deformation during the relative displacements of the two said members between which said container is interposed.

One object of the invention is to provide a cushioning device of the above mentioned type allowing said two members to be moved on a large extent with relation to each other for a relatively small diameter of said cushioning device.

Another object of the invention is to provide a cushioning device of the above mentioned type which is formed of a plurality of superimposed compartments communicating with one another and avoiding between said compartments the prejudicial joints causing generally leakage of the fluid contained in said compartments.

Another object of the invention is to provide a cushioning device of the above mentioned type which is effective in use and simple in the structure.

An embodiment of the cushioning device according to the invention is shown, in sectional view, on the Fig. 1 and in perspective view on the Fig. 2 of the accompanying drawing.

Between the two elements 1 and 2 whose relative displacements are to be damped is mounted a flexible outer casing 3 consisting of india rubber or like material. This casing, at least when in the idle position and before it is put in place, has a shape represented preferably by a surface of revolution about the axis X—X. The generatrix $a$—$b$ of this surface of revolution consists of a curve having successive convex portions 20 and concave portions 21. This surface of revolution is bounded at its ends by two beaded edges 4 and 5 having optionally the same diameter and made inextensible by the use of inextensible rings 6 or like mountings. Moreover, the bottom of each concave portion 21 is also made inextensible by an intermediate mounting 6', such as a heavy cord or a steel wire. In comparison with casings formed only by a convex shaped member, the casing of the present invention affords a greater amplitude of motion for an outer diameter D which is less than the diameter of a single convex member, shown in the dotted lines 23, which would serve the same purpose. In comparison with separate superimposed elements, the casing of the present invention, which is made of one piece of rubber or like material, is of a simpler structure and has a greater flexibility.

The casing 3 is reinforced by a stiffening which consists of a tissue made of cord which is crossed but not woven of the kind in current use for the construction of the usual pneumatic tyres for vehicles. Fig. 2 shows two series of cords 25 and 26 which cross each other and which are embedded in the india rubber of the casing. The cords of the tissue are held upon the rings 6 and 6' as in the usual pneumatic tyres. The casing 3 may be fluid tight by itself, or it may be made fluid tight by inserting in said casing 3 an extensible inner chamber 7.

Air or another gaseous or liquid fluid required for inflating the casing 3 is supplied through the tube 8, the initial pressure in the casing 3 being regulated by hand or automatically.

The casing 3 is secured to the elements 1 and 2 by means of the wired edge 4 and 5. The edge 4 is held between the element 1 and a plate 9 which is secured to said element by bolts 10 or the like. The wired edge 5 is held in a like manner between a plate 11 and the second element 2. Annular external guideways 23 and 24 are formed in each inner plate 9 and 11 and in the corresponding member 1 and 2, the walls of said guideways diverging from the adjacent surfaces of said plate and member and being adapted to contain the beaded edges 4 and 5 of the casing 3.

The casing 3 may be connected to a chamber 12 by a passage having a cross section of such size as to afford the proper dampening of all oscillating movement. The circulation of fluid from the casing 3 to the chamber 12, or inversely, may be regulated for instance by a calibrated orifice 14 formed in a valve 15 urged upon its seating 16 by a calibrated spring 17. The chamber 12 is provided at 13 with a valve or like filling device.

When the two elements 1 and 2 approach each other in an abrupt manner, as soon as the fluid in the casing 3 becomes compressed to a degree corresponding to the allowable maximum, the valve 15 opens, thus compressing the spring 17 and the fluid will freely escape into the chamber 12.

In the case of relatively slow motion of the elements 1 and 2, or of motion having a small amplitude, the valve 15 remains upon its seating and the compressed fluid circulates through the calibrated orifice 14 in order to assume the desired dampening.

The dampening can also be obtained by placing in the casing 3 a piece of india rubber sponge 22 or like porous substance, which by reason of its nature will flatten the air or other elastic fluid in its recesses according as the pressure varies.

Having now described my invention what I claim as new and desire to secure by Letters Patent is:

A cushioning device between two members whose relative displacements are to be damped comprising a substantially tubular deformable casing of flexible material bounded at its ends by two rounded beaded edges, at each end of said casing an inner plate, means for securing said inner plate to said corresponding member, and an annular external guideway of rounded section extending in the adjacent faces of each inner plate and of the corresponding member and having walls diverging from the adjacent surfaces of said plate and member at the inner end of said guideway to the free edges of said guideway and adapted to guide said beaded edges of said casing.

JEAN MERCIER.